United States Patent [19]

Sallas et al.

[11] Patent Number: 5,115,880
[45] Date of Patent: May 26, 1992

[54] PIEZOELECTRIC SEISMIC VIBRATOR WITH HYDRAULIC AMPLIFIER

[75] Inventors: John J. Sallas, Plano; Michael A. Corrigan, Carrollton, both of Tex.

[73] Assignee: Halliburton Geophysical Services, Duncan, Okla.

[21] Appl. No.: 749,058

[22] Filed: May 8, 1989

[51] Int. Cl.⁵ ............................................. G01V 1/40
[52] U.S. Cl. .................................. 181/106; 367/143; 367/166; 367/912
[58] Field of Search ........ 181/106, 118, 121, 102–105; 367/911, 912, 157, 158, 163, 165, 166, 189, 143

[56] References Cited

U.S. PATENT DOCUMENTS

| 4,869,349 | 9/1989 | Minear et al. | 181/102 |
| 4,996,674 | 2/1991 | Thompson | 367/158 |

Primary Examiner—Brian S. Steinberger

[57] ABSTRACT

A piezoelectric seismic vibrator is disclosed which utilizes a hydraulic system to amplify the longitudinal displacement which results from the application of a voltage to a stack of piezoelectric elements. In each disclosed embodiment of the present invention, a stack of piezoelectric elements is mounted so as to bear upon a power piston which in turn acts upon a high bulk modulus substantially incompressible body of fluid, such as mercury. A drive piston is provided having a cross-sectional area which is smaller than the area of the power piston and the pressure within the fluid system acts to amplify the longitudinal displacement of the piezoelectric elements. The movement of the drive piston is then coupled mechanically or fluidically to the earth to generate seismic waves therein. In one depicted embodiment of the present invention each stack of piezoelectric elements is disposed within a fluid filled chamber which is pressurized by means of communication with the borehole fluids.

17 Claims, 5 Drawing Sheets

PIEZOELECTRIC SEISMIC VIBRATOR WITH HYDRAULIC AMPLIFIER

BACKGROUND OF THE INVENTION

1. Field of the Invention

The present invention relates to seismic energy sources, and in particular to those adapted for nondestructive generation of seismic energy in applications where size, space, and power limitations are critical, such as in a downhole environment. The present invention has also demonstrated utility in other environments, as will hereinafter be demonstrated.

2. Description of the Prior Art

During exploratory oil and gas drilling, it is obviously desirable to ascertain as much information about the formations surrounding the wellbore as possible, in order to identify and accurately locate producing zones and potential producing zones. Well logs are often employed to determine resistivity, conductivity and other characteristics of formations.

In addition to logs, it is also known to utilize a geophone or geophones disposed in a wellbore at various depths to receive seismic energy generated by sources on the surface of the earth. The seismic energy, which is in the form of waves, refracts and reflects as it travels through the encountered formations until it is received by the geophones. Raw data from the geophones is subsequently processed by computer into usable forms for determining formation characteristics. One major disadvantage associated with surface sources is the alteration of the source energy in the weathering layer or LVL on the way to the geophones.

Currently, the above described technique is used extensively in conjunction with "Vertical Seismic Profiling" or VSP, wherein a geophone is lowered in stages to various depths in the wellbore, while seismic energy is generated on the surface, at various locations (offsets) which are remote from the wellbore. The data thus generated is generally processed to obtain useful data in manners well known to the art. It may be readily appreciated that the relocation of both geophones and seismic sources is both costly and time-consuming and that, in populous areas, numerous or often-moved surface sources may be impractical.

To overcome the forgoing limitations of VSP, "Reverse Vertical Seismic Profiling," (RVSP) has been developed as an alternative. In RVSP, a seismic source is placed in a wellbore and an array of geophones is disposed on the surface. The use of a nondestructive downhole source having repetitive energy generation capability is critical for utilization with rapid, repetitive shots and a suitable source of this type must also be usable without causing damage to the well in a cased or uncased hole. This technique also demonstrates the advantage of location below the weathering layer or LVL, and is therefore not subject to the above-mentioned attenuation prior to reflection from and refraction by deeper formations of interest.

Ideally, it is desirable to utilize various types of seismic energy waves, such as P-waves, $S_v$-waves, and $S_h$-waves in formation analysis, in order to take advantage of the current state of information processing. This is particularly true in crosswell tomography (also known as cross-bores by surveying) wherein a source is placed in one wellbore and geophones in an adjacent wellbore.

Several attempts at the creation of suitable downhole sources have been made in the recent past. See, for example, U.S. Pat. Nos. 4,702,343 and 4,715,470, wherein, respectively, downhole seismic energy is generated utilizing a servo-controlled hydraulic pumping mechanism or a linear electromagnetic actuator to drive a reactive mass. Seismic energy is imparted to the walls of the wellbore in these applications via a clamping mechanism. Pneumatic downhole seismic sources have also been attempted, as noted by H.C. Hardee, "Downhole Periodic Seismic Sources", *Geophysical Prospecting* 31, 57–71 (1983). All of the foregoing devices have the disadvantages of being relatively complex mechanically, difficult to package in a compact form suitable for deployment in small wellbores, and of requiring a significant input of energy in order to generate an acceptably strong seismic energy wave.

In a somewhat related field, both magnetostrictive and piezoelectric expansion phenomena have been suggested at the basis for downhole energy waves utilized for acoustic well logging. See, for example, U.S. Pat. Nos. 4,649,525, 4,682,308, and 4,700,803. Piezoelectric bender-type vibrational transducers are also known, such as that disclosed in U.S. Pat. No. 4,525,645. That stacked piezoelectric elements or wafers may be employed to generate significant longitudinal forces is also recognized in U.S. Pat. Nos. 4,753,507 and 4,674,907. The major problems, however, with using either directly applied piezoelectric or magnetostrictive forces to generate energy waves is associated with the relatively small length changes in either type of materials. In other words, while significant forces are possible, significant displacements to move a wave-generating element for seismic purposes are not. In addition, magnetostrictive devices, like their hydraulic or electromagnetic counterparts require unacceptably high input power levels for downhole application.

SUMMARY OF THE INVENTION

In contrast to the prior art, the present invention comprises, in its preferred embodiments, a piezoelectric seismic vibrator wherein a hydraulic system is employed to amplify the longitudinal displacement resulting from application of voltage to a stack of piezoelectric elements. The amplified displacement is utilized to accelerate a reaction mass to create a reaction force for the generation of seismic energy. Depending upon the configuration of the present invention employed, reciprocating, torsional or radial displacements, motions and forces may be generated with the reaction waves.

The piezoelectric seismic vibrator with hydraulic amplifiers of the present invention is highly efficient and requires little electrical current, as piezoelectric materials respond to an applied voltage, not current, as in magnetostrictive devices which require large currents to generate the required flux densities via transformer windings.

The preferred embodiment of the piezoelectric seismic vibrator with hydraulic amplifier of the present invention also possesses significant advantages over servo valve controlled hydraulic systems prior art counterparts, in that the prior art devices produce a non-linear response to the control or pilot signal. Also, of course, a servo valve cannot open, close or shift position instantaneously, nor can large amounts of hydraulic fluid travel into and out of a power chamber of a vibrator rapidly to move a reaction mass. In addition, there are significant energy losses associated with the use of servo valves and the long, convoluted and restricted hydraulic fluid passages associated therewith. The piezoelectric vibrator with hydraulic amplifier of the present invention requires no servo valves or fluid lines, and the response of the piezoelectric element stacks are essentially instantaneous.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE INVENTION

Figure 1:
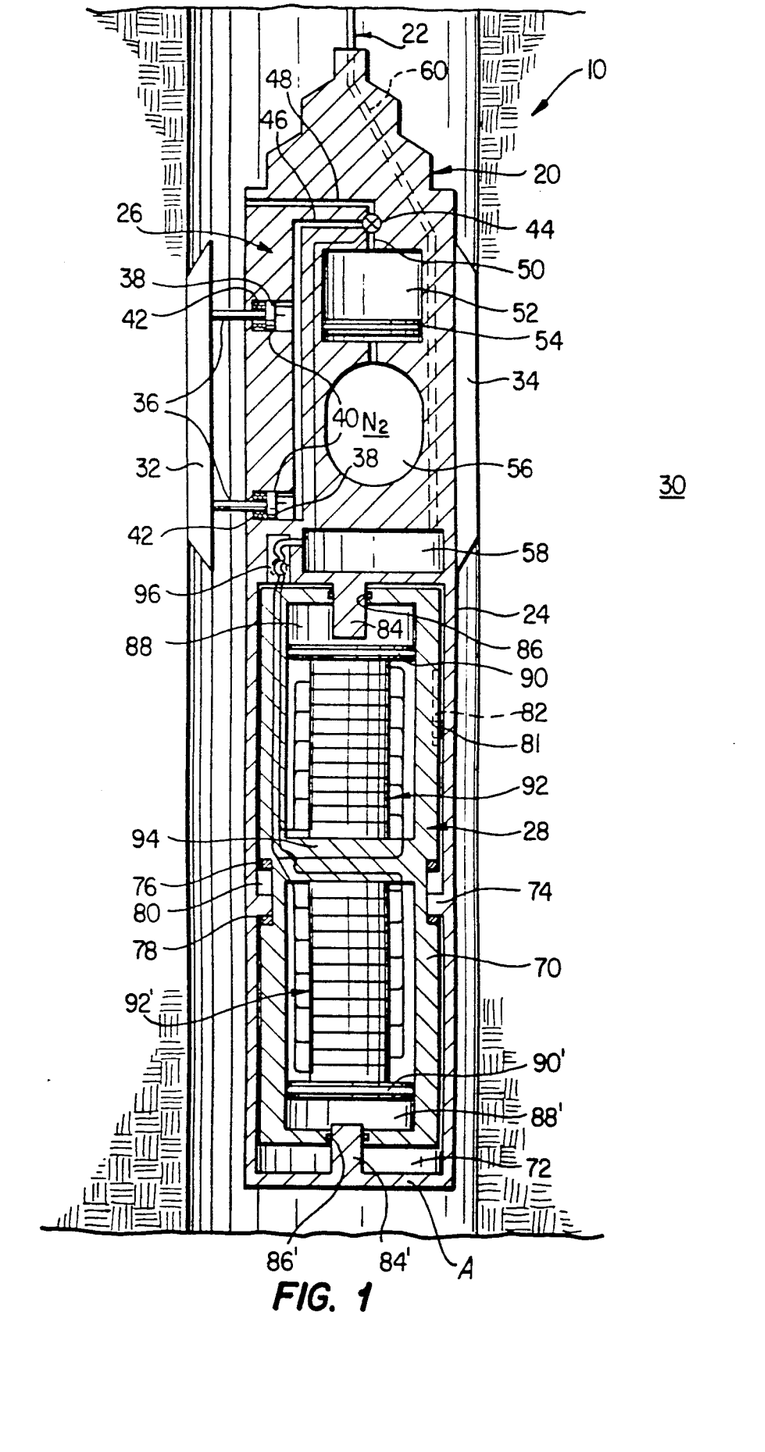
FIG. 1 schematically illustrates the downhole reciprocating energy source of the present invention.

Referring now to FIG. 1, a wellbore 10 is depicted. Disposed therein is a reciprocating energy source 20, which may be lowered into the wellbore 10 via wireline 22, as shown. Source 20 comprises a housing 24 which contains two major assemblies, clamping assembly 26 and seismic energy assembly 28.

Clamping assembly 26 is merely illustrative of such devices as known in the art, and does not in itself comprise a portion of the present invention except insofar as it is necessary to employ such an apparatus to effectively couple source 20 to the wellbore wall for transmission of seismic energy pulses from seismic energy assembly 28 to the surrounding formation 30. Clamping assembly 26 preferably includes movable pad 32 and stationary pad 34 for contacting the wall of wellbore 10. Pad 32 is disposed at the end of a pair of actuator rods 36, having hydraulic pistons 38 disposed at their inner ends. Pistons 38 are located within cylinders 40 in housing 24, and are preferably biased inwardly to a retracted position by spring means 42, which may comprise coil, Belleville or other springs known in the art. Cylinders 40 are filled at their inner ends with a noncompressible hydraulic fluid and are in communication with three-way solenoid valve 44 via actuation passage 46. Solenoid valve 44 is in turn also in communication with bleed passage 48 and reservoir passage 50. Bleed passage 48 leads to the exterior of housing 24, and reservoir passage 50 leads from hydraulic fluid reservoir 52 to solenoid valve 44. Fluid in reservoir 52 is pressurized by reservoir piston 54, the lower side of which is acted upon by high-pressure $N_2$ in reservoir 56, which is charged to an appropriate pressure level at the surface before source 20 is placed in the borehole.

Solenoid valve 44 is initially set in its first position, which isolates both actuation passage 46 and bleed passage 48 from reservoir passage 50, before source 20 is run into the wellbore 10. Movable pad 32 is retracted and maintained in retraction by spring means 42. After source 20 reaches the desired wellbore location for generation of seismic energy, solenoid valve 46 is commanded to its second position by control module 58, which is powered by wireline 22 via internal conductors 60, shown in broken lines. In this position, hydraulic fluid is released from pressurized reservoir 52 through valve 44 into actuation passage 46, wherein it acts upon pistons 38 in cylinders 40, urging actuator rods 36 and pad 32, outwardly into contact with the wall of wellbore 10, whereby housing 24 is clamped in energy transmitting relationship thereto between pads 32 and 34. At such time as source 20 is to be retrieved from wellbore 10, solenoid valve 44 is commanded to its third position wherein bleed passage 48 is placed in communication with actuation passage 46, and the pressurized fluid therein is exhausted into wellbore 10. Thereafter, pad 32 is retracted against housing 20 due to the equalization of pressures on the inner and outer sides of piston 38 and the forces exerted by spring means 42.

It should be understood that the above described clamping assembly 26 is set forth generally as one exemplary system of this type, and that other systems known in the art could serve an equivalent function. For example, a magnetically operated system could be employed, or a screw-jack type system driven by an electric motor; alternately, a simple mechanically, hydraulically or explosively set packer-slip assembly such as is well known in the downhole tool art might be employed.

Referring again to FIG. 1, seismic assembly 28 comprises a reciprocal inner reaction mass 70 which reciprocates in chamber 72 of housing 22. Travel of the reaction mass 70 is limited by inwardly-extending annular flange 74 which contacts impact bearings 76 and 78 which are disposed at the upper and lower ends of vertically extending annular recess 80 in the outer wall of reaction mass 70. Rotation of reaction mass 70 is prohibited by means of key 81 which extends inwardly from the wall of chamber 72 into vertical slot 82 in the outer wall of reaction mass 70.

Disposed at the upper and lower ends of chamber 72 are drive pistons 84 and 84' of cross-sectional areas A, which extend downwardly and upwardly, respectively into apertures 86 and 86' in the wall of reaction mass 70. As those skilled in the art will appreciate, annular seals may be utilized to effect a fluid tight seal therebetween. Drive chambers 88 and 88', containing a high bulk modulus fluid with high temperature stability, preferably mercury, are located at the upper and lower ends of reaction mass 70, in communication with drive pistons 84 and 84', via apertures 86 and 86'. The inward ends of drive chambers 88 and 88' are defined by movable power pistons 90 and 90', which are of greater diameter and significantly greater cross-sectional areas than the ends of drive pistons 84 and 84'. Located below and above power pistons 90 and 90' respectively, lie two stacks of piezoelectric elements, and 92 and 92', the innermost ends of which abut bulkhead 94 at the middle of reaction mass 70. Piezoelectric element stacks 92 and 92' comprises a plurality of thin circular, square, rectangular or other polyhedral shaped elements or discs of a poled piezoelectric material such as lead meta-niobate, ceramic lead zirconate titanate (PZT) ceramic or other suitable material, stacked vertically. Conductor set 96 leads from control module 58 to each piezoelectric element stack 92 and 92', in parallel, to supply a voltage thereto. The polarity of the voltage across each stack being opposite to that applied to the other stack. As a result, when a voltage is applied, one stack will expand in proportion to the electrical field, while the other stack will contract at the same time, virtually simultaneously and in a linear fashion.

By applying a sinusoidal voltage to piezoelectric element stacks 92 and 92', each stack undergoes time varying extension and contraction. As, for example, stack 92 extends in length, it applies an upwardly directional force to power piston 90, and so upon the fluid in drive chamber 88. The attempted reduction by power piston 90 of the volume of chamber 88 results in reaction mass 70 being pushed away (downward) from drive piston 84 so that the volume of chamber 88 can remain constant, given the incompressible nature of the fluid in the chamber. When the voltage applied reverses, and stack 92 contracts, power piston 90 moves downwardly, tending to enlarge drive chamber 88, whereby drive piston 84 is permitted to re-enter chamber 88 to a greater result, again to keep chamber volume constant. As a result, reaction mass 70 moves upward.

As the polarity of the voltage applied to stack 92 is opposite to that applied to stack 92', the extension and contraction of stacks 92 and 92' will augment each other in the movement of reaction mass 70.

As ceramic materials do not, in general, have great tensile strengths, it may be desirable to apply a compressional preload to stacks 92 and 92' to avoid subsequent fracture of the individual discs within stacks 92 and 92' under the application and reversal of voltages when source 20 is operated. Preloading may be accomplished in several ways however, the simplest way may be to provide a threaded plug (not shown) in the wall of reaction mass 70 adjacent chambers 88 and 88', so that such plugs may be driven inwardly to an appropriate point to induce compression of stacks 92 and 92' via movement of power pistons 90 and 90'. Alternatively, drive pistons 84 and 84' may have source adjustable travel with respect to housing 22, and preload applied in that manner. Finally, a screw mechanism or hydraulic system may be incorporated within bulkhead 94 to preload from the inner ends of stacks 92 and 92', the manner of preloading not being critical to the practice of the invention.

In operation, the embodiment of FIG. 1 generates seismic energy through longitudinal reciprocation of reaction mass 70 within chamber 72 in response to the extension and contraction of piezoelectric element stacks 92 and 92'. The displacement of reaction mass 70 is the total extension of a piezoelectric stack as multiplied by the ratio of the cross-sectional area of power pistons 90 and 90' to the cross-sectional area of drive pistons 84 and 84'. For example, if piezoelectric stack 92 is capable of a total of ¼" extension when subjected to a selected voltage of the correct polarity, and the area of power piston 90 is eight times the area of drive piston 84, the displacement of reaction mass 70 will be 8×¼", or 2" total. This amplified reaction mass displacement by means of the hydraulics of the system greatly increases the reaction force over prior art devices due to the increased acceleration of reaction mass 70 due to the well known relationship F=mg. A pressure transducer (not shown) may be located in chamber 88 or 88' to sense the force developed by the actuator and used as a feedback signal to control module 52 for phase and amplitude control. Since source 20 is clamped to the wall of the wellbore 10 by clamping assembly 26, as heretofore described, the reaction energy generated in seismic energy assembly 28 is transferred to the formation surrounding the borehole and radiated as seismic energy in the form of vertical shear, or $S_V$, waves.

Figures 2, 2A:
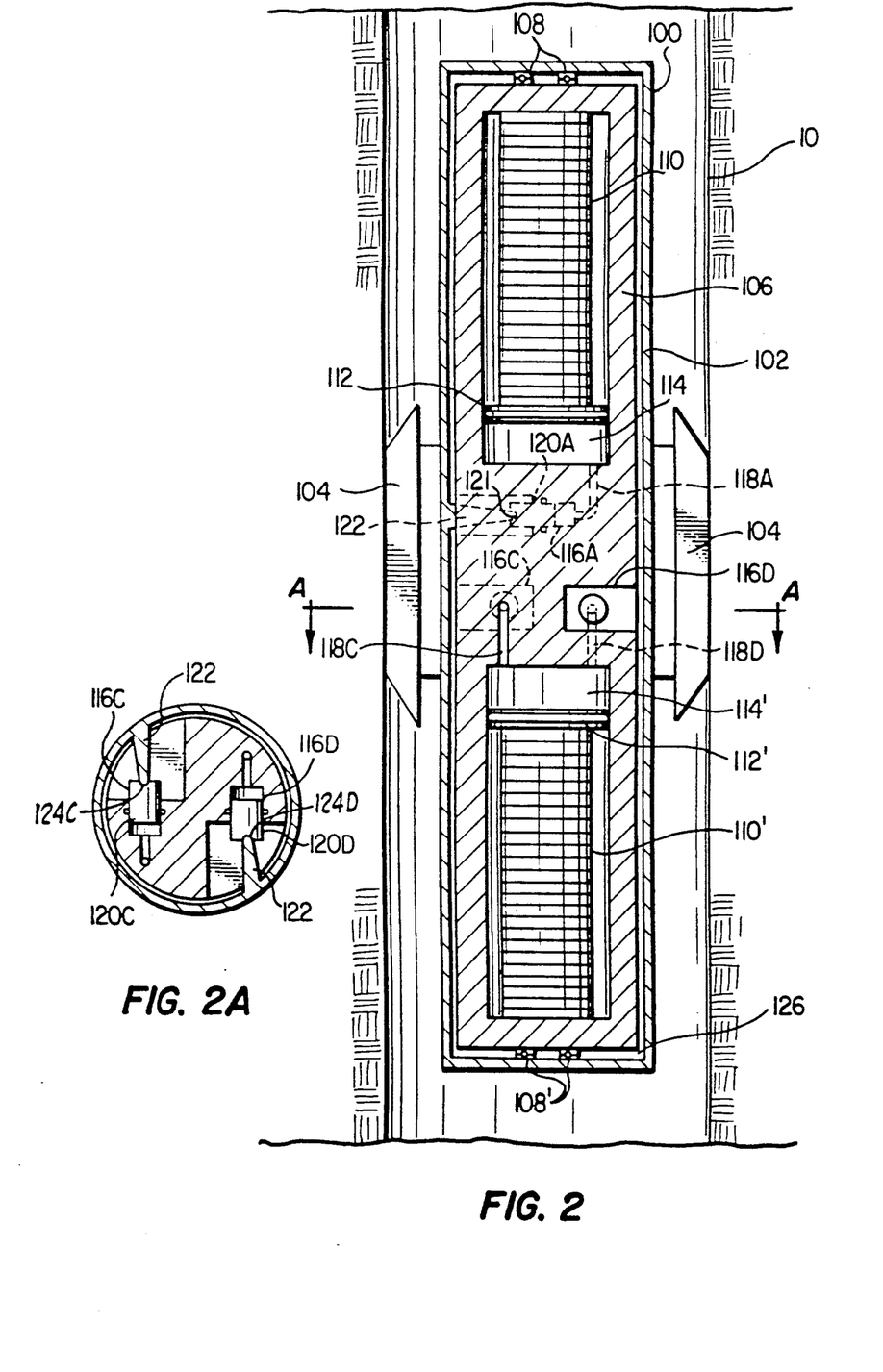
FIG. 2 schematically illustrates a downhole, torsional energy source adaptation of the vibrator of the present invention.

FIG. 2 depicts a second preferred embodiment of the present invention adapted to generate horizontal shear, or $S_H$, waves of seismic energy. Since a suitable deployment means, i.e., wireline, and clamp means have already been disclosed and described with respect to the embodiment of FIG. 1, they have been omitted in FIG. 2; however, it should be understood that such means would also be employed with the embodiment of FIG. 2.

Seismic energy source 100 includes a housing 102 having associated therewith a plurality of clamps 104 which are extended outwardly therefrom into contact with the wall of wellbore 10 in which source 100 is disposed. The means for extending and retracting clamps 104, of which there are preferably three or more equally circumferentially disposed about housing 102 may be of any of the means discussed previously with respect to FIG. 1.

Disposed within housing 102 is reaction mass 106, which is supported therein by roller, ball or needle bearing assemblies 108 and 108' so as to permit rotation of reaction mass 106 within housing 102. Reaction mass 106 includes upper and lower piezoelectric disc stacks 110 and 110', which are preferably precompressionally loaded as in the embodiment of FIG. 1 and which bear against power pistons 112 and 112', the latter defining outer, movable walls of power chambers 1144 and 114', which are filled with a high bulk modulus relatively incompressible fluid, such as mercury. Power chambers 114 and 114' are, in turn linked with drive cylinders 116A, 116B, 116C, and 116D by passages 118A, 118B, 118C, and 118D, respectively (116B and 118B not being shown as they are located behind 116A and 118A in a plane perpendicular to the drawing FIG. 2).

Drive cylinders 116 contain drive pistons 120A, 120B, 120C and 120D which are of cylindrical configuration and in fluid-tight sliding sealing engagement with the walls of cylinders 116. Pistons 120 each have a leading face with a cup-shaped notch or recess 121 in the center thereof, into which a torsion rod 122 having a like configured end which extends from housing 102. It should be noted that torsion rods 122 are all in radial plane, and offset from the diameter of reaction mass 106 and housing 102, and that each rod 122 and its associated drive piston 120 are disposed in linkage recesses 124A, B, C, and D, (124A and B not shown) respectively in reaction mass 106 to permit uninhibited relative movement at the points of contact therebetween. The ends of rods 122 or the recesses 121 may comprise a low friction, high wear resistance bearing material to cut friction losses and promote an acceptable cycle life. Moreover, the space 126 between housing 102 and reaction mass 106 may be filled with a suitable liquid, such as hydraulic oil, to promote heat transfer to the surrounding wellbore and to lubricate bearing assemblies 108 and 108' and the points of contact between drive pistons 120 and their associated torsion rods 122.

As with source 20, source 100 is activated by application of a suitable periodic voltage of alternating polarities to piezoelectric disc stacks 110 and 110'. However, unlike source 30 of FIG. 1, the polarity of the voltage applied to each stack 110 and 110' may be the same, so that both stacks elongate at the same time and contract at the same time, so as to double the force applied in one rotational direction to the wellbore wall. Alternatively, the applied polarities may be opposite, so as to obtain a positive rotational force in each direction.

Source 100 operates as follows. When a suitable voltage is applied to disc stacks 110 and 110', assuming the applied polarities are the same, both stacks elongate and drive power pistons 112 and 112' longitudinally inwardly in power chambers 114 and 114', displacing the fluid therein into passages 118 and then into drive cylinders 116, where the fluid acts upon drive pistons 120, moving them outward into linkage recesses and acting upon torsion rods 122, the contact points therebetween permitting a pivotal motion as pistons 120 extend and reaction mass 106 rotates, due to such extension, in the opposite direction. When the voltage polarity is reversed, disc stacks 110 and 110' contract, and stored energy in tension rods 122 returns reaction mass 106 to its original position. Alternatively, as noted above, drive pistons 120, and their associated tension rods 122 may be oriented so that two pistons in one plane drive in one rotational direction, and two in another plane drive in the opposite rotational direction. In such event, opposite polarity voltages would be applied to disc stacks 110 and 110' at the same time, so that one would extend at the same instant the other would contract, thereby providing a positive rotational drive for reaction mass 106 in each direction.

Again, as with source 100, the acceleration of the reaction mass provides the reaction force which is transmitted through clamps 104 to the wellbore wall and surrounding formation as seismic energy in the form of horizontal shear waves, or $S_H$ waves.

Figure 3:
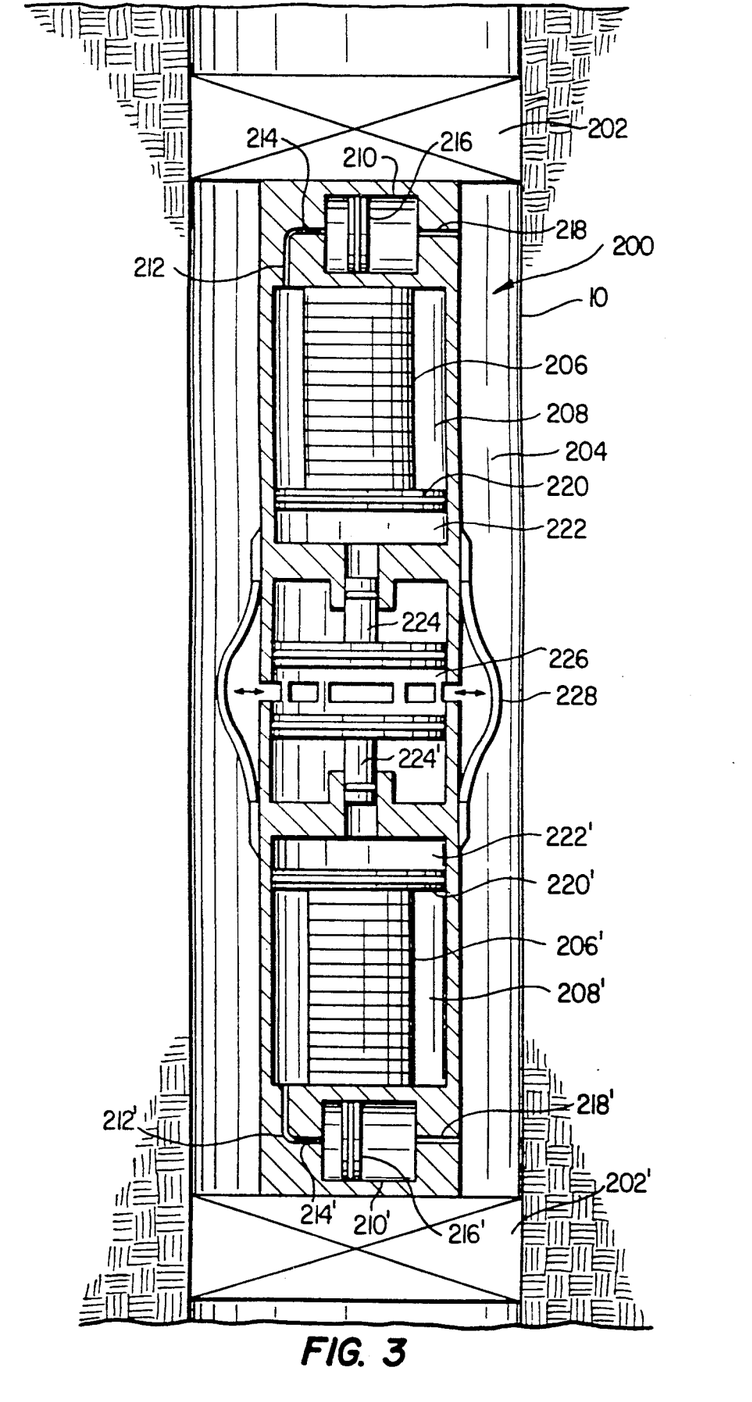
FIG. 3 schematically illustrates a downhole, fluid pressure energy source adaptation of the vibrator of the present invention.

With reference now to FIG. 3 there is depicted a downhole, fluid pressure energy source which may be implemented with the seismic energy source of the present invention. As above, suitable deployment means, including a wireline, have already been disclosed and will not be shown herein.

Fluid pressure energy source 200 is shown disposed within wellbore 10 and isolated within a particular section thereof by means of packers 202 and 202'. Packers 202 and 202' each comprise an inflatable or otherwise actuatable packer which may be operated to isolate energy source 200 within a closed volume 204 of borehole fluid in order to maximize the pulse effect. As above, energy source 200 includes piezoelectric disc stacks 206 and 206' which are disposed within fluid filled chambers 208 and 208'.

Fluid filled chambers 208 and 208' are utilized to equalize the pressure on piezoelectric stacks 206 and 206' in the following manner. Each fluid filled chamber 208 and 208' is preferably connected to an equalization chamber 210 and 210' respectively, by means of passages 212 and 212', each of which preferably includes a filter element 214 and 214' which is utilized to prohibit the contamination of fluids therein by borehole fluids. Within each equalization chamber 210 and 210' is a piston 216 and 216' which is acted upon by borehole pressure, via passages 218 and 218'. In this manner, the pressure within closed volume 204 acts upon pistons 216 and 216' and thereby pressurizes the fluid within fluid filled chambers 208 and 208' to a pressure equal to that within closed volume 204.

As discussed with respect to the aforementioned embodiments, piezoelectric stacks 206 and 206' bear against power pistons 220 and 220', each defining an outer movable wall of power chambers 222 and 222', which are filled with a high bulk modulus relatively incompressible fluid, such as mercury. Power chambers 222 and 222' are in turn linked to drive cylinders 224 and 224', which are of cylindrical configuration and in fluid-tight sliding sealing engagement within the walls of chambers 222 and 222'. Thus, as appropriate voltages are applied to piezoelectric stacks 206 and 206', causing elongation and contraction thereof, drive cylinders 224 and 224', are moved inward and outward, forcing an incompressible fluid in and out of aperture plate 226. This pulsation of fluid is coupled to the closed volume of borehole fluid through flexible membrane 228 which preferably comprises a suitable rubber or synthetic fabric.

Figure 4:
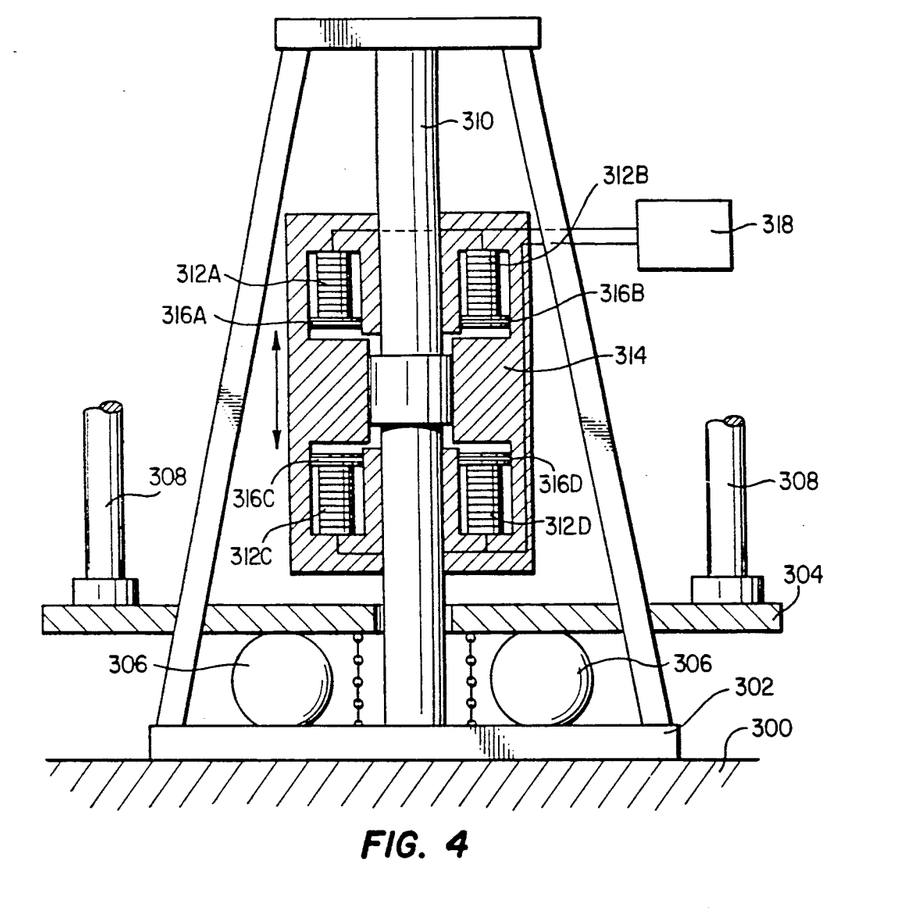
FIG. 4 schematically illustrates a surface reciprocating energy source adaptation of the present invention.

Referring now to FIG. 4, there is depicted a surface reciprocating seismic energy source adaptation of the apparatus of the present invention. As may be seen, the embodiment depicted in FIG. 4 is designed to be operated upon the surface of the earth 300 and to transmit vibrational seismic signals into the earth via base plate 302. The seismic source depicted within FIG. 4 in schematic form is preferably a transportable via a vehicle (not shown) which is supported upon vehicle supports 308 and serves to press baseplate 302 against the surface of the earth 300 by means of hold down plate 304. Those skilled in the art will appreciate that hold down plate 304 is preferably isolated from base plate 302 by means of air bags 306 or other suitable devices.

As in the embodiments discussed above, the seismic source depicted within FIG. 4 includes a plurality of piezoelectric stacks 312A-312D, each of which is electrically coupled to control means 318. Control means 318 is preferably utilized to generate a suitable time varying electrical signal which is coupled to each piezoelectric element stack 312A-312D in order to generate the desired elongation and contraction thereof. As above, each piezoelectric element stack bears upon a respective power piston 316A-316D which, in accordance with the hydraulic amplifier aspect of the present invention, amplifies the pressure which is brought to bear upon reaction mass 314. Reaction mass 314 is preferably coupled to central shaft 310 and, in accordance with the teachings of the present application may be utilized to generate a vibrational seismic signal which may be imparted to the surface of the earth via base plate 302.

Figure 5:
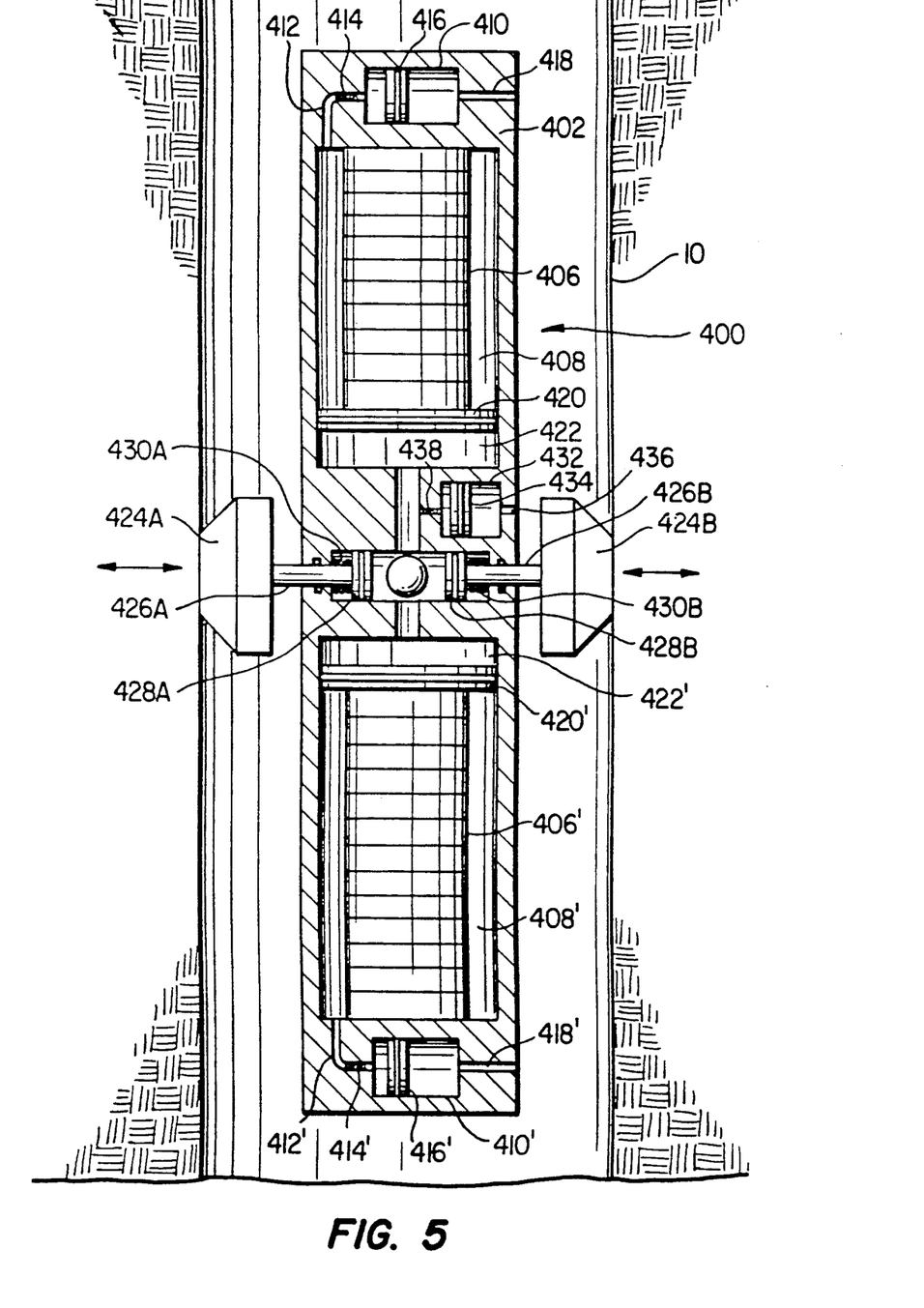
FIG. 5 schematically illustrates a downhole, radial compressional energy source adaptation of the present invention.

Finally, with reference to FIG. 5, there is depicted a schematic illustration of a downhole radial compressional energy source adaption of the seismic source invention of the present invention. As in FIG. 3 the radial compressional energy source 400 depicted within FIG. 5 includes a pair of piezoelectric element stacks 406 and 406' which are disposed within fluid filled chambers 408 and 408'. In the manner discussed above, fluid filled chambers 408 and 408' are utilized to equalize the pressure on piezoelectric stacks 406 and 406' by means of equalization chambers 410 and 410' respectively. As an additional option in the embodiment depicted within FIG. 5, multiple additional equalization chambers such as chamber 432 may be provided, each including a piston 434 which is acted upon by the pressure of borehole fluids via aperture 436. The movement of piston 434 acts upon the fluid therein which is then coupled via passage 438 to provide pressure equalization on both sides of power piston 420.

The operation of radial compressional energy source 400 is identical in concept to the previous embodiments disclosed. That is, the application of a suitable time varying voltage to piezoelectric stacks 406 and 406' will cause a corresponding elongation and contraction thereof, bearing upon power pistons 420 and 420'. The movement of power pistons 420 and 420' within power chambers 422 and 422' will cause a force to be applied to drive pistons 428A and 428B. As is illustrated, drive pistons 428A and 428B are coupled via rods 426A and 426B to cause impact pistons 424A and 424B to compress the inner walls of borehole 10. In the embodiment disclosed, spring elements 430A and 430B are utilized to bias drive pistons 428A and 428B into a retracted position, thereby facilitating the insertion of rapid compressional source 400 into the borehole. Of course, those skilled in the art will appreciate that multiple impact pistons may be utilized to generate a radial compressional energy wave outward from the axis of borehole 10 in the manner depicted herein.

While the invention has been particularly shown and described with reference to a preferred embodiment, it will be understood by those skilled in the art that various changes in form and detail may be made therein without departing from the spirit and scope of the invention.

What is claimed is:

1. A seismic energy source for imparting seismic energy into earth formations, said seismic energy source comprising:
    a hydraulic system containing a substantially incompressible fluid and having a power piston and a drive piston wherein small movements of said power piston generate substantially larger movements of said drive piston;
    a piezoelectric element adapted to elongate and contract in response to the application of an appropriate electrical signal;
    means coupling said piezoelectric element to said power piston; and
    means for imparting seismic energy into earth formations in response to movement of said drive piston.

2. The seismic energy source for imparting seismic energy into earth formations according to claim 1 wherein said piezoelectric element comprises a plurality of discs of piezoelectric material stacked vertically.

3. The seismic energy source for imparting seismic energy into earth formations according to claim 2 wherein said means coupling said piezoelectric element to said power piston comprises means for mounting said plurality of discs of piezoelectric material directly to said power piston.

4. The seismic energy source for imparting seismic energy into earth formations according to claim 1 wherein said piezoelectric element is mounted within a fluid filled chamber adapted to impart pressure to said piezoelectric element.

5. A seismic energy source adapted to be lowered into a fluid filled wellbore for imparting seismic energy into the earth formation surrounding said wellbore, said seismic energy source comprising:
    a sonde adapted to be lowered into said wellbore;
    clamping means for selectively clamping said sonde within said wellbore at a selected depth;
    a hydraulic system disposed within said sonde containing a volume of substantially incompressible fluid and having a power piston and a drive piston wherein small movements of said power piston generate substantially larger movements of said drive piston;
    a piezoelectric element adapted to elongate and contract in response to the application of an appropriate electrical signal;
    means coupling said piezoelectric element to said power piston; and
    a reaction mass coupled to said drive piston, wherein application of an appropriate electrical signal to said piezoelectric element will result in a substantial movement of said reaction mass, imparting seismic energy into said earth formations surrounding said wellbore.

6. The seismic energy source of claim 5 wherein said clamping means comprises at least one movable pad and means for urging said at least one movable pad radially outward into contact with said wellbore.

7. The seismic energy source of claim 6 wherein said at least one movable pad is coupled to a pneumatic system which is selectively operable to urge said at least one movable pad radially outward.

8. The seismic energy source of claim 5 wherein said volume of substantially incompressible fluid comprises mercury.

9. The seismic energy source of claim 5 wherein said piezoelectric element comprises a plurality of discs of piezoelectric material stacked vertically.

10. The seismic energy source of claim 9 wherein said means coupling said piezoelectric element to said power piston comprises means for mounting said plurality of thin discs of piezoelectric material directly to said power piston.

11. The seismic energy source of claim 5 wherein said reaction mass is mounted within said sonde so as to move longitudinally within said sonde in response to the movement of said drive piston.

12. The seismic energy source of claim 5 wherein said reaction mass is mounted within said sonde so as to move rotationally within said sonde in response to the movement of said drive piston.

13. A seismic energy source adapted to be lowered into a fluid filled wellbore for imparting seismic energy into the earth formation surrounding said wellbore, said seismic energy source comprising:
    a sonde adapted to be lowered into said wellbore;
    packer means for selectively isolating said sonde within a closed volume of fluid within said wellbore;
    a hydraulic system disposed within said sonde containing a volume of substantially incompressible fluid and having a power piston and a drive piston wherein small movements of said power piston generate substantially larger movements of said drive piston;
    a piezoelectric element adapted to elongate and contract in response to the application of an appropriate electrical signal;
    means coupling said piezoelectric element to said power piston; and
    a second volume of substantially incompressible fluid coupled to said drive piston and disposed within said sonde, separated from said closed volume of fluid within said wellbore by a flexible membrane, wherein application of an appropriate electrical signal to said piezoelectric element will result in the application of fluid pressure energy to said fluid within said wellbore through said flexible membrane.

14. The seismic energy source of claim 13 wherein said volume of substantially incompressible fluid comprises mercury.

15. The seismic energy source of claim 13 wherein said piezoelectric element comprises a plurality of discs of piezoelectric material stacked vertically.

16. The seismic energy source of claim 15 wherein said means coupling said piezoelectric element to said power piston comprises means for mounting said plurality of discs of piezoelectric material directly to said power piston.

17. The seismic energy source of claim 13 wherein said piezoelectric element comprises two piezoelectric elements arranged longitudinally within said sonde on opposite sides of said second volume of substantially incompressible fluid.

* * * * *